(12) United States Patent
Olson

(10) Patent No.: US 11,928,852 B2
(45) Date of Patent: Mar. 12, 2024

(54) SYSTEM FOR TRANSMISSION AND DIGITIZATION OF MACHINE TELEMETRY

(71) Applicant: Theia Group Incorporated, Philadelphia, PA (US)

(72) Inventor: Erlend Olson, Albuquerque, NM (US)

(73) Assignee: Theia Group, Incorporated, Philadelphia, PA (US)

(*) Notice: Subject to any disclaimer, the term of this patent is extended or adjusted under 35 U.S.C. 154(b) by 0 days.

(21) Appl. No.: 17/739,587

(22) Filed: May 9, 2022

(65) Prior Publication Data
US 2023/0052760 A1    Feb. 16, 2023

Related U.S. Application Data

(63) Continuation of application No. 15/610,057, filed on May 31, 2017, now Pat. No. 11,328,162.

(60) Provisional application No. 62/343,430, filed on May 31, 2016.

(51) Int. Cl.
| | |
|---|---|
| G06V 10/75 | (2022.01) |
| G01D 7/00 | (2006.01) |
| G06V 10/147 | (2022.01) |
| G06V 10/94 | (2022.01) |
| G06V 20/52 | (2022.01) |
| G06V 20/62 | (2022.01) |
| H04N 7/01 | (2006.01) |
| H04N 23/57 | (2023.01) |

(52) U.S. Cl.
CPC ............ *G06V 10/758* (2022.01); *G01D 7/00* (2013.01); *G06V 10/147* (2022.01); *G06V 10/95* (2022.01); *G06V 20/52* (2022.01); *G06V 20/62* (2022.01); *H04N 7/0127* (2013.01); *H04N 23/57* (2023.01); *G06V 2201/02* (2022.01)

(58) Field of Classification Search
CPC ...... G01D 7/00; G06K 9/00771; G06K 9/209; G06K 9/6212; H04N 5/2257; H04N 7/0127
See application file for complete search history.

(56) References Cited

U.S. PATENT DOCUMENTS

| | | | |
|---|---|---|---|
| 4,568,972 | A | 2/1986 | Arents |
| 5,673,331 | A | 9/1997 | Lewis et al. |
| 5,805,813 | A | 9/1998 | Schweitzer, III |

(Continued)

FOREIGN PATENT DOCUMENTS

| | | |
|---|---|---|
| CN | 105049786 A | 11/2015 |
| EP | 1419964 A1 | 5/2004 |

(Continued)

OTHER PUBLICATIONS

Klosterman, "Vision helps perform predictive maintenance". Vision Systems Design, Apr. 11, 2016, pp. 1-8, [online], [retrieved on Aug. 16, 2017], URL: http:..www.vision-systems.com/articles/print/volume-21/issue-4/features/vision-helps-perform-predictive-maintenance.html.

(Continued)

*Primary Examiner* — Neil R Mikeska
(74) *Attorney, Agent, or Firm* — Bonini IP Law, LLC; Frank J. Bonini, Jr.

(57) ABSTRACT

A system for digitizing gauges, lights and other human-readable machine gauges and functions and status without interfering with the operation of the machine or requiring re-working or interfering with the existing machine wiring, signaling, electrical or mechanical elements or operating modes, or adding new digitizing equipment to the machine.

19 Claims, 3 Drawing Sheets

(56) References Cited

U.S. PATENT DOCUMENTS

| | | |
|---|---|---|
| 5,870,140 A | 2/1999 | Gillberry |
| 6,208,266 B1 | 3/2001 | Lyons et al. |
| 6,961,445 B1 | 11/2005 | Jensen et al. |
| 7,697,028 B1 | 4/2010 | Johnson |
| 8,786,706 B2 | 7/2014 | Kennedy et al. |
| 9,088,699 B2 | 7/2015 | An et al. |
| 9,546,002 B1 | 1/2017 | Azcuenaga et al. |
| 2003/0138146 A1 | 7/2003 | Johnson et al. |
| 2005/0246295 A1 | 11/2005 | Cameron |
| 2007/0130599 A1 | 6/2007 | Monroe |
| 2007/0236366 A1 | 10/2007 | Gur et al. |
| 2008/0089666 A1 | 4/2008 | Aman |
| 2009/0190795 A1 | 7/2009 | Derkalousdian et al. |
| 2009/0251542 A1 | 10/2009 | Cohen et al. |
| 2009/0322884 A1 | 12/2009 | Bolick et al. |
| 2011/0012989 A1 | 1/2011 | Tseng et al. |
| 2011/0149067 A1 | 6/2011 | Lewis et al. |
| 2013/0070099 A1 | 3/2013 | Gellaboina et al. |
| 2013/0115050 A1 | 5/2013 | Twerdochlib |
| 2014/0347482 A1 | 11/2014 | Weinmann et al. |
| 2015/0003665 A1 | 1/2015 | Kumar |
| 2015/0109136 A1 | 4/2015 | Capozella et al. |
| 2016/0086031 A1 | 3/2016 | Shigeno et al. |
| 2016/0086034 A1 | 3/2016 | Kennedy et al. |
| 2016/0104046 A1 | 4/2016 | Doettling et al. |
| 2016/0109263 A1 | 4/2016 | Dubs |
| 2016/0314367 A1 | 10/2016 | Chmiel et al. |
| 2017/0088048 A1 | 3/2017 | Iwamoto |
| 2017/0116725 A1 | 4/2017 | Stuart et al. |
| 2017/0163944 A1 | 6/2017 | Jeong |
| 2017/0169593 A1 | 6/2017 | Leigh et al. |
| 2017/0249731 A1 | 8/2017 | Van Gorp et al. |
| 2018/0253619 A1 | 9/2018 | Petruk |

FOREIGN PATENT DOCUMENTS

| | | |
|---|---|---|
| JP | 1990271699 | 3/1990 |
| JP | 2002008181 | 1/2002 |
| JP | 2002188939 | 7/2002 |
| JP | 2002342870 | 11/2002 |
| JP | 2003242587 | 8/2003 |
| JP | 2003331376 | 11/2003 |
| JP | 2010176202 | 8/2010 |

OTHER PUBLICATIONS

Guler Puren, et al. Real-time multi-camera video analytics system on GPU, Journal of Real-Time Image Processing, Springer DE, vol. 11, No. 3, Mar. 27, 2013, pp. 457-472, XP035643528.

Jörg Barrho et al., "Visual Tracking of Human Hands for a Hazard Analysis based on Particle Filtering", Proc. 11th IPMU Int. Conf., Jan. 1, 2006, pp. 1-4, XP055698840.

Gil-Jimenez, P. et al., "Automatic Control of Video Surveillance camera Sabotage", Jun. 18, 2007, Nature Inspired Problem-Solving Methods in Knowledge Engineering; Springer Berlin Heidelberg, pp. 222-231, XP019095486, ISBN 978-3-540-73054-5.

Zainul Abdin Jaffrey et al., "Architecture of Noninvasive Real Time Visual Monitoring System for Dial Type Measuring Instrument", IEEE Sensors Journal, IEEE Service Center, NY, NY, US, vol. 13, No. 4, Apr. 1, 2013, pp. 1236-1244, XP011493885.

Mark Curtis, "Handbook of Dimensional Measurement, 5th ed.", Jan. 1, 2013, Industrial Press XP055654382, p. 86, Figures 5-3.

SYSTEM FOR TRANSMISSION AND DIGITIZATION OF MACHINE TELEMETRY

CROSS-REFERENCE TO THE RELATED APPLICATIONS

This patent application claims the benefit under 35 U.S.C. 119 and 35 U.S.C. 120 of U.S. provisional application Ser. No. 62/343,430 entitled "System for Transmission and Digitization of Machine Telemetry", filed May 31, 2016, the complete contents of which is herein incorporated by reference

BACKGROUND OF THE INVENTION

1. Field of the Invention

The present invention relates to the field of digitized imagery for the state of a machine, and more particularly, for monitoring the changing state based on imaging of analog or other physical state conditions of an apparatus that take place as the change occurs.

2. Brief Description of the Related Art

With the ubiquity of global communications links, much of the world and its machines can be connected rapidly and easily to other machines and digital control systems on a worldwide basis. It is now possible to create digital control loops and employ global networks to enable machines to directly communicate important information to other machines (so-called M2M applications), to enable automated decision making without the intervention of humans. However, unlike human-to-human communications which may be in the form of voice or images, M2M applications generally require the transmission of digital data. One common part of many M2M applications today is simply converting analog telemetry and signals from a machine into a digital form, suitable for transmission over the internet. Examples, without limitation, include converting the electrical signals that drive analog type gauges on a mobile machine like a vehicle, boat or airplane, or which drive the gauges a remotely located machine like an oil rig or switch gear in a switch yard, into digital representations of said signals and sending the resulting digital representations of the electrical signals to another location via wired or wireless internet for further action or monitoring by another machine, or human. However, many machines are designed originally with gauges and indicator lights which are intended only for humans to view them, and enabling such machines to transmit a digital version of their indicator lights or gauges requires extensive modifications to the machine and interruption of the electrical signaling systems in such machines. The effort required to perform the analog to digital conversion or even the copying of already digital information gauges into a form transmittable over the internet, reduces the rate of adoption of M2M communication functions in system applications that could benefit. Furthermore, some machines present regulatory or safety or warranty difficulties in converting them to be able to send digital information from their control systems or gauges. For example the high voltages in switch gear or motor control gear must be fully isolated from the low voltage circuits that normally digitize and communicate data over the internet; gauges and wiring on an aircraft cannot be tampered with or changed without affecting the aircraft's airworthiness certificate; new circuitry to digitize analog gauges, or to tap into signals already present in digital form on a vehicle cannot be easily added without violating the warranty on the vehicle.

What is needed is a system for digitizing gauges, lights and other human-readable machine gauges and functions and status without interfering with the operation of the machine or requiring re-working or interfering with the existing machine wiring, signaling, electrical or mechanical elements or operating modes, or adding new digitizing equipment to the machine.

SUMMARY OF THE INVENTION

The present invention provides a system for digitizing devices, such as gauges, lights and other human-readable machine gauges and functions and status. The system operates without the need to reconfigure operations or electronic components of the device being monitored. The potential for adversely interfering with the operation of the machine is eliminated, and there is no need to re-work any of the machine components or interfere with the existing machine wiring, signaling, electrical or mechanical elements or operating modes. In addition the system may be implemented using equipment configured by the system, which does not require the addition of new digitizing equipment to the machine.

These and other advantages may be provided by the invention.

BRIEF DESCRIPTION OF THE DRAWING FIGURES

FIG. 4A is a depiction of an exemplary frame used to illustrate the image capture of a motor.

FIG. 4B is a depiction of the exemplary frame in FIG. 4A showing an exemplary variance region of an image capture area.

FIG. 5 is a graph representing an exemplary depiction showing image variation of an operating device for captured images over a period of time.

DETAILED DESCRIPTION OF THE INVENTION

Figure 1:
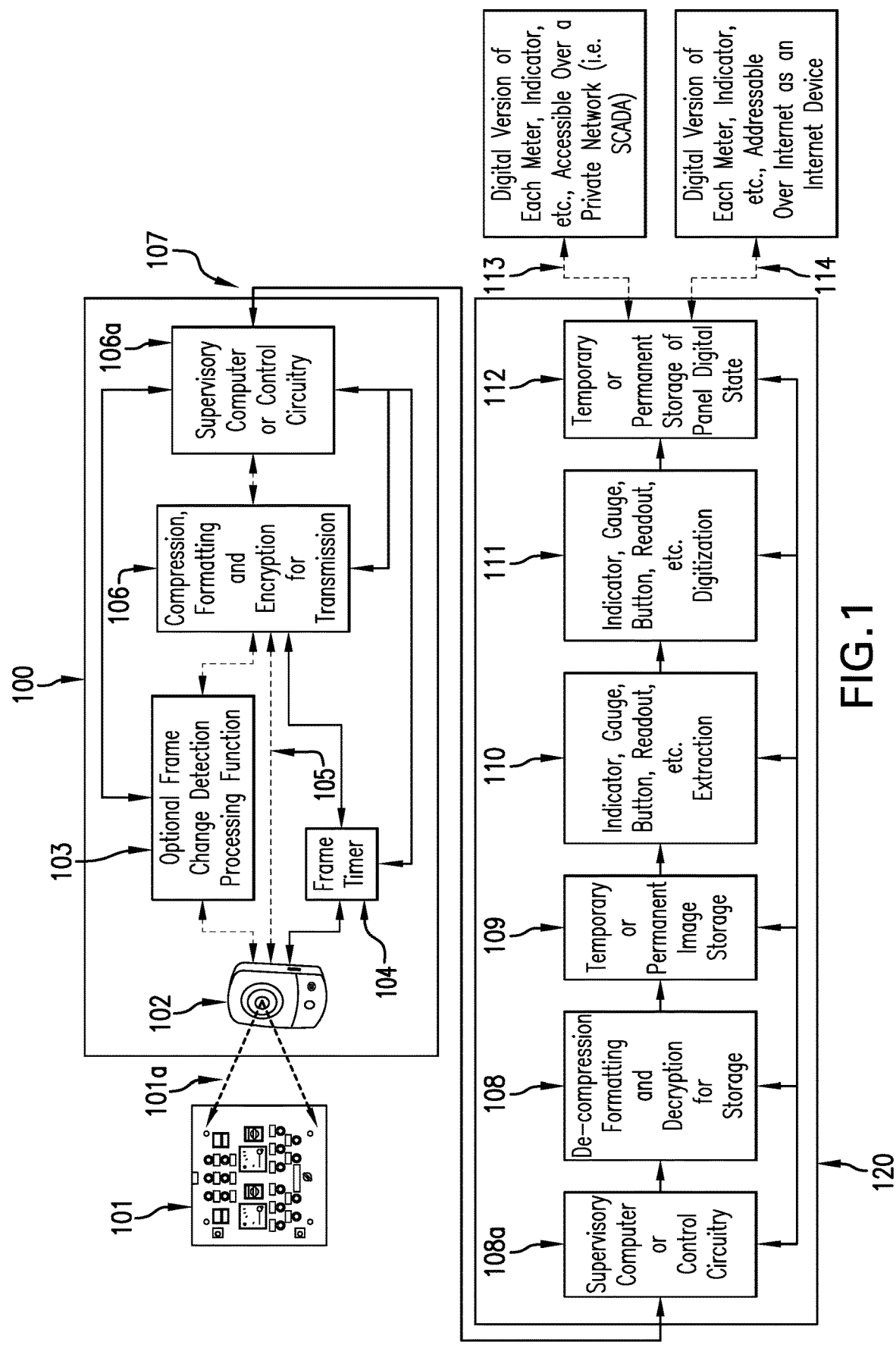
FIG. 1 is a preferred embodiment of the invention, depicting in perspective view a camera and a panel, and showing a diagram of a preferred implementation of the system according to a first exemplary embodiment.

A preferred embodiment of the invention, called the image-M2M system, is depicted in FIG. 1. In the preferred embodiment, a panel with meters, indictors and switches, 101, is being monitored and any or all of the indicators are being digitized by the invention. Note that other than either ambient or purposeful illumination, the light reflected off of the panel, 101A (without departing from generality may be infrared light or other non-visible wavelengths) is the only relationship between the panel and the invention, and there is no physical or electric connection between the invention and the machine being monitored whatsoever. A camera, 102, is physically placed in the vicinity of the machine being monitored so that its field of view, 101A, covers one or more gauges or lights or control panels to be monitored. According to some alternate embodiments, the camera may comprise an infrared-capable camera (and according to some embodiments the camera is capable of imaging both visible and infrared illumination). An infrared illumination means may be provided (e.g., separately, as part of the camera, or in association therewith) to illuminate the panel so that panels in dark rooms or at night may be captured by the camera. The resolution of the camera 102 is chosen to be sufficient to give a sufficient granularity on a pixel basis to provide the necessary resolution desired for the ultimate digitization of each meter or indicator. The camera, 102, takes pictures of the panel. The rate of the picture frames may be either intermittent based on a frame timer 104 which is programmed either manually, or remotely via a local control system which may contain within it either a general or special purpose processor for executing a software or firmware program 106A, or a processing function implemented either in hardware, software or a combination of the two, which captures frames of the panel only when a change in the panel itself occurs, 103, or the camera may produce continuous video, 105. The frames or video are optionally compressed, formatted and encrypted, 106, and then made available to be either proactively sent or retrieved on demand by supervisory circuitry or computer 106A. It should be understood that all of the functions 102, 103, 104, 105, 106 and 106A may be combined in a single implementation in hardware, software or firmware on a single processor and may optionally be entirely contained with camera 102 and all of the functions may be optionally controlled by the supervisory control computer 106A. These elements comprise what is termed the remote system 100.

The images are then communicated over a network connection 107, which may be the internet, or a private communications link, and of which one or more segments may be electrically wired, optically linked, or wirelessly linked via a terrestrial wireless link or a satellite wireless link. This network connection 107 may also serve to provide command and control directives to the Supervisory control circuitry 106A. The images provided by the remote system 100 arrive at separate supervisory and control circuitry, 108A, and subsequent decompression, formatting and decryption functions 108. The resulting images can then be stored either permanently or temporarily in a memory or other electronic storage device 109. Subsequently, extraction and digitization algorithms are employed 110, 111, which, as further described below, turns each image into a sequence of digital values associated with any or all of the indicators, meters, gauges or switches in the image of the panel. The extraction algorithm 110 and digitization algorithm 111 may be pre-programmed or may operate selectively on various parts of the panel on a request basis, and may include optical character recognition (OCR) sub-algorithms. The results may then optionally be stored in a memory device 112, which can then be accessed by either a private communications system, such as a SCADA network, or a standards based network such as the internet. By the many means well known to those practiced in the art, the data available in memory 112 may be presented to the internet as individually addressable, or as sub-addressable, data elements. As indicated, all of the functions 108a, 108, 109, 110, 111 and 112 may be contained within a single sub-system of hardware and software, 120, or within only software operating on a larger server farm (not shown).

In the above manner, one or more indicators, readouts, meters and the like may become digital numbers, each addressable at an address or sub-address over the internet, without any direct connection to, or interference with, the operation of the said indicators in the panel 101.

The change detection function 103 may be programmed to provide for the capture of a frame or video when any external object interrupts the view of the panel or meters, such as a human operator adjusting controls or taking other actions. In this way, the invention provides additional security and information which would not necessarily be present in a simple digital telemetry stream which were formed by digitization of the signals within the panel itself. Also, the remote system 100 can be programmed to recognize certain alarm conditions such as a specific indicator light, or a hot temperature and instigate communications with the local system on its own.

Figure 2:
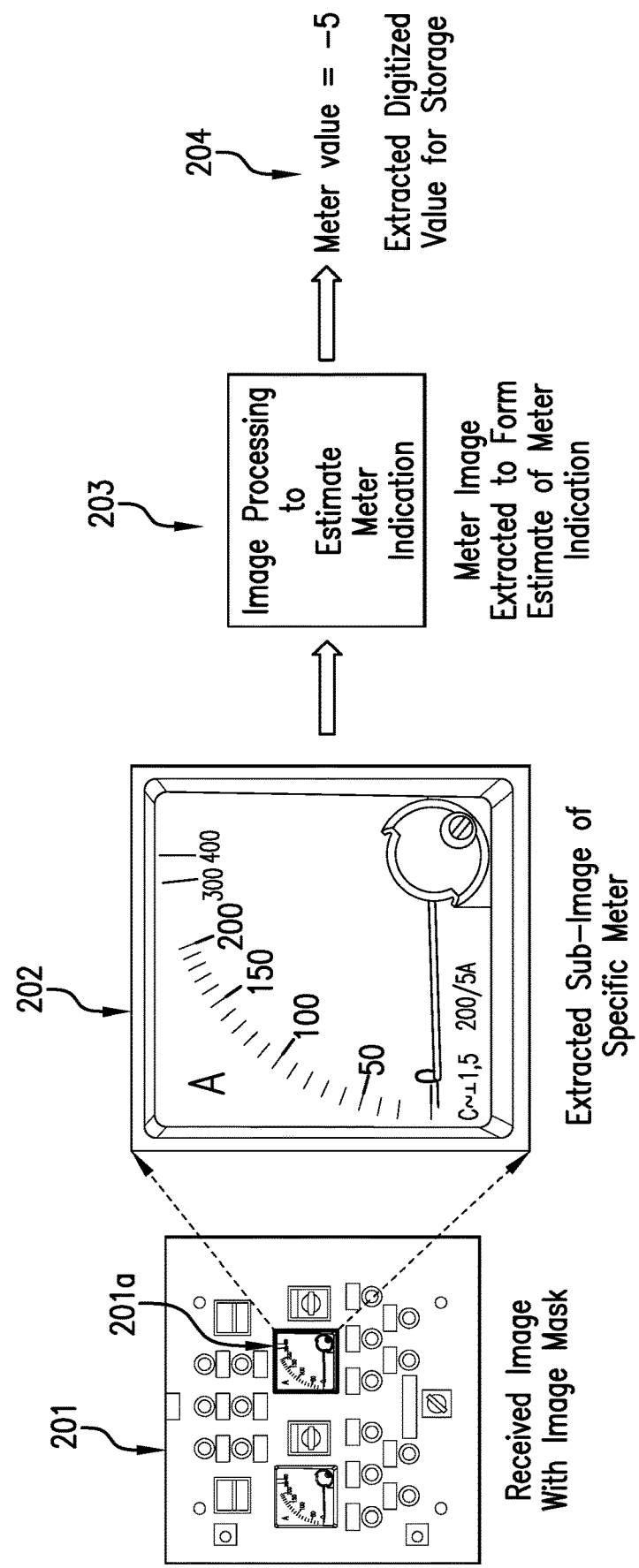
FIG. 2 is front elevation view of the panel of FIG. 1 with an enlarged extracted image portion showing a specific meter of the panel, and process depictions according to an exemplary implementation of the system.

Now the readout extraction and digitization algorithms will be described, with reference to FIGS. 2 and 3. In the case of an analog type meter in FIG. 2, on the local system when the first instance of image capture occurs where there are many indicators, meters or gauges which may not need to be digitized, each meter to be digitized from the larger image 201 is extracted into a sub-image 202, using a simple master mask or other simple sub-image extraction algorithm well known, and available in many common off-the-shelf image processing packages, such as Matlab. An image mask 201A can be automatically or one-time manually created to assist the sub-image creation step. Once the sub-image of a particular meter or indicator is created, depending on the type of meter, various straightforward image processing and extraction methods can be employed to ascertain the meter reading. For example, for the meter in 203, a Hough transform can be employed to ascertain automatically the angle of the indicator from horizontal, and that angle associated in a table with indicated meter values. For a generalized method, a reference image of the meter at each possible indication discernible by the pixilation of the image can be stored a priori in the local processing system, where each image is associated with a digital value indicated by the meter, and correlated against the sub-image 203 to determine which of the reference images is the closest match to the received sub-image. There are many other image processing methods generally well known to those practiced in the art of image processing that may be employed in step 203 without departing from the current invention. At the conclusion of step 203, the meter or indicator value 204 is stored in the local system as a digital value, in this case negative five.

Figure 3:
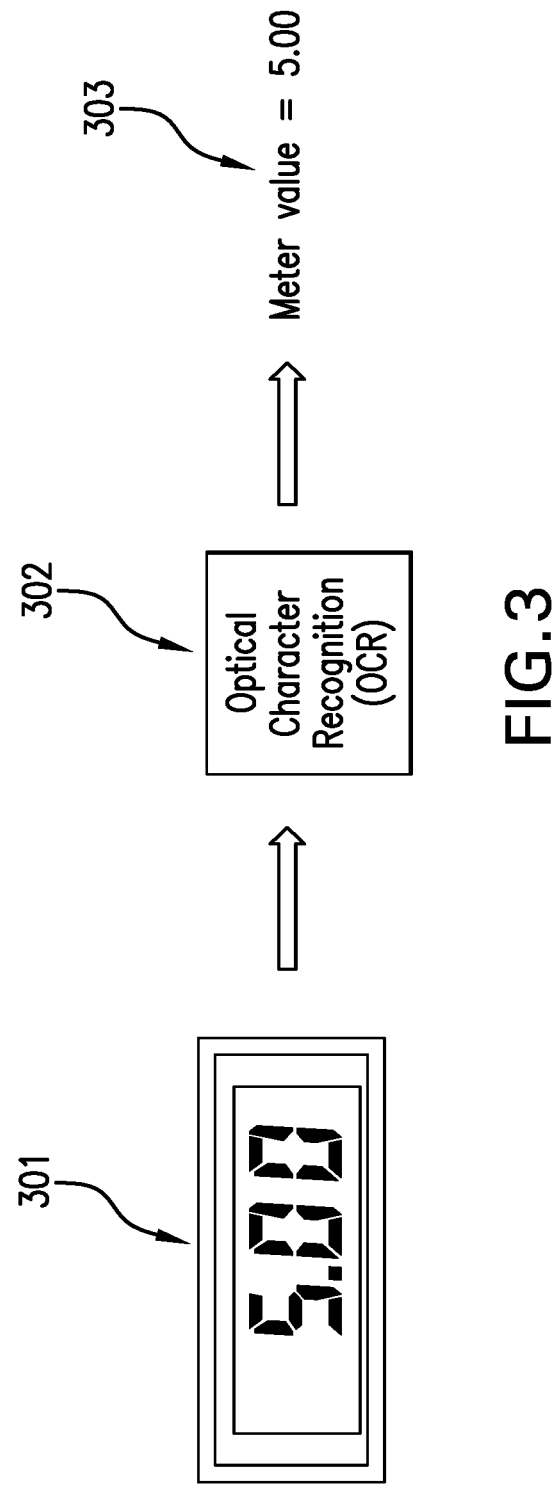
FIG. 3 is a front elevation view showing a digital panel meter and process depictions according to an exemplary implementation of the system.

Referring to FIG. 3, after sub-image creation, an existing digital panel meter 301 can be easily converted into a digital value 303 from a sub-image through simple optical character recognition program 302, which are generally available in off-the-shelf software.

The image-M2M invention system can also add additional functions to the image processing, such as perspective de-warping in the case where a camera is not mounted head-on to a meter or indicator, or where a large panel is imaged, without departing from the invention. Libraries of common meters may be maintained for easy manual and/or automated initial setup.

The image-M2M invention presented has the advantages of being able to adapt to a wide variety of gauges, meters and indicators, including many which may not be easily amenable to digitization with traditional embedded telemetry measurement and analog-to-digital electrical or mechanical techniques. In addition, through the use of the camera and the image system, many meters or indicators may be captured and digitized at once. Furthermore, the image-M2M system can provide additional information not normally available from traditional telemetry, such as when an employee operated a dial, inspected a machine, or similar environmental or incidental events which would otherwise go unrecorded. In addition, a camera may be focused on a motor or engine or set of pulleys or belts, and may make a frame-to-frame comparison to determine the amount of vibration or torque movement in the motor or engine, providing information which would otherwise be very difficult to ascertain remotely, even with sophisticated telemetry.

According to one exemplary embodiment, the system is configured with one or more cameras which are focused on one or more aspects of a motor or engine, including connected or associated components, such as, for example, drive or driven mechanisms. For example, a camera is positioned to have its focus directed to the engine or motor, or operating portion or component. The camera images the field of view and provides an image frame that is comprised of an image area A. The image area A is illustrated in FIGS. 4A and 4B showing an exemplary depiction of an image frame. In the image area A shown in FIG. 4A, there is a depiction of a motor 310, which is a captured image of a motor. The motor image 310 takes up a portion of the image area A. The motor image area preferably represents image coordinates, which may comprise pixels. In the depiction of the solid line motor 310 of FIG. 4A, the motor 310 is shown in a static state, represented by the motor image area Ams. The broken-line depictions represent the motor 310 at operating positions, where the motor 310 during operation is vibrating. The images captured of the operating motor 310 within the frame area A are at different locations within the frame area A, and are represented by the motor positions Am1, Am2, Am3 (three different positions being shown for illustration purposes). Although the vibrational motor positions are shown in a two dimensional coordinate depiction in the figures, according to alternate embodiments, the system may be configured to account for movement that is forward (into the plane of the page) or rearward (out of the plane of the page), in addition to, or alternative to, the two dimensional plane.

The motor image area or an operating motor $A_O$ may be set to image area coordinates within which the motor 310 is imaged when operating, and more preferably, when operating within acceptable ranges. In this example, the range represents an acceptable vibration level. The motor vibration is imaged by the motor positioning within the image area A. The motor image area may represent a number of separate motor images Am1, Am2, Am3, . . . AmN, where each separate image corresponds with a set of image coordinates or pixels of the image frame capture (at different times), which, in this example, may be represented by the image area A. The image coordinates of each image may be used to determine an operation parameter, which, in this example, is a vibration level, and an acceptable vibration level. Referring to FIG. 4B, in this example, an image area or boundary of an operating motor image location is represented by $A_O$. The image area $A_O$ of the operating motor may be generated by the represented motor positions within the camera frame that correspond with acceptable positions as a result of vibrational movement or disturbances of the operating motor under acceptable operating conditions. The motor 310 may be imaged in a non-operating state to provide a static image Ams (see FIG. 4A), which represents the motor static position level within the frame or area A. The vibrational variances may be determined by the position of the motor 310 within the image area A at a given time, or over a given time interval or series of frames. For example, where the boundary of acceptable motor vibration $A_O$ is exceeded, an operating event may be detected and recorded. The system may be configured with software containing instructions to detect operating events, and generate a response when an operating event has been detected (such as a positive detection result). For example, some responses may include recording the event to a log, issuing an alert, notifying a particular individual or machine (computer), to shutting down the device (the motor in this example), or combinations of these.

According to some implementations, the system is configured to process the motor image AmT (where, for example, the motor image Am represents an image at a particular time T), and compare the pixels or coordinates of the motor image location on the image field to determine whether the motor image parameters have been breached. The breach may be confirmed by a determination that the processed image reveals the motor (e.g., portion thereof) being detected at a position within the frame that is outside of a designated motor image boundary area, which in this example is the motor image boundary area $A_O$. For example, where $A_O$ defines a set of coordinates within which the motor imaging is acceptable for the motor position or location, and a motor image breaches the coordinate boundary, a positive detection result may be recorded. According to some embodiments, pixel locations and values of the motor images may be compared (for example, to an absolute value or reference value), to determine whether a breach of an acceptable operating condition has occurred.

Alternately, the motor vibration may be determined with reference to a deviation from the static image position Ams. For example, the separate images Am1, Am2, Am3, . . . AmN of the motor during operation of the motor may provide image coordinates that are different than the static image coordinates Ams (although it is possible that some of the images Am1, . . . AmN may correspond with the status image Ams as the motor is operating). A variance level may be determined for the image area of an operating motor, and the camera may operate as shown and described herein, with continuous imaging, or a frame rate imaging, which ascertains an image of the motor. Referring to FIG. 5, a plot of motor image change or variation $\Delta$Am from a static condition image (Ams) over time T is shown. The graph depicts an acceptable variance range region, and variant range regions outside of the acceptable range region. The range or variance parameters may be designated and predetermined based on accepted movements or vibrations of the motor during normal operations or operations deemed to be acceptable. The variance may be provided to proscribe when motor vibrations exceed an acceptable or threshold level, which is represented by the motor imaging locations within an image frame, and as the motor imaging locations may be represented by pixels or coordinates.

According to some alternate embodiments, the system may be configured to image a particular portion of a component, such as the motor. For example, a pulley wheel, or a portion thereof, such as, the top portion, may be imaged, and when its radial portion being imaged is detected to have breached an arc range (e.g., as defined by the frame coordinates), which previously was determined to be an acceptable operating range, a positive detection result may be initiated. In addition, an alert or other operation may be generated.

The system may be configured to generate a response to a positive detection (where the motor vibration is detected and determined to be operating outside of acceptable parameters), which may be from storing the result for later use in maintenance, or to relay an instruction to shut down the motor, or any other response, which may be to send an alert to an operator or technician (and allow the motor to continue). In addition, the vibration level image data may be processed and stored, as images, or as processed information. The vibration levels may be provided to recreate motor movements that were imaged. In addition, the vibration image data, such as, for example, the position of the motor within a frame, or processed vibration data ascertained from the images, may be time-stamped to provide an indication of the time of operation. This may be useful to determine whether there is a particular load, time of day, or operation that produces an associated motor operation.

Although the example is provided in conjunction with a motor, other operating components may be used and imaged, and the image information processed to determine whether the component operation is within an acceptable operation parameter or condition. In addition, a plurality of cameras may be provided to image a respective plurality of components, and the images of multiple components may be determined and detected by the system.

Furthermore, the camera system may be augmented with audio information or an audio track which can record the sounds of buzzers, alarms or other audible signaling which is otherwise unobservable by the image system. Also, the sounds of motors or engines may be recorded so that if they begin to make unusual sounds, a local action can be taken for what might otherwise be an unobserved remote phenomenon.

These and other advantages may be realized with the present invention. While the invention has been described with reference to specific embodiments, the description is illustrative and is not to be construed as limiting the scope of the invention. Although a plurality of motor images are shown on the image frame A of FIG. 4A, the images may represent an image captured on separate frames and represent separately captured image frames. Various modifications and changes may occur to those skilled in the art without departing from the spirit and scope of the invention described herein and as defined by the appended claims.

What is claimed is:

1. A method for monitoring a change in analog or other physical state conditions of a monitoring device such as a gauge, meter, light or other human-readable machine monitor that are in use for monitoring a condition, or a control that allows a human to control a condition, the method comprising:
    a) operating a camera with at least one subsystem having a supervisory computer or control circuitry;
    b) communicating images obtained with the camera to the subsystem via a communications component, and wherein the subsystem includes a processor and software containing instructions for storing the communicated images and for manipulating the images, wherein the images comprise one of more frames of video;
    c) receiving the communicated images, and storing and manipulating the received communicated images via the processor and software containing instructions for storing the communicated images and for manipulating the images;
    d) manipulating the images by processing instructions with the processor of the subsystem by extracting at least a sufficient portion of the image;
    e) digitizing the gauge, meter, light or other human-readable portion of the device by digitizing the extracted image or image portion that is obtained with the camera and communicated to the subsystem and converting the extracted image or image portion into a sequence of digital values associated with the said device that is in use for monitoring a condition such as a gauge, meter, light or other human-readable machine monitor;
    f) wherein the subsystem comprises a first subsystem and a second subsystem, wherein the first subsystem includes the camera and communications component and includes a supervisory computer or control circuitry, and wherein the second subsystem includes a supervisory computer or control circuitry;
    g) wherein operating the camera is carried out with the first subsystem supervisory computer or control circuitry or the second subsystem supervisory computer or control circuitry;
    h) providing access to at least one network comprising one or more of the Internet or SCADA network;
    i) generating with said subsystem addressable values and making said addressable values accessible through said one or more of said Internet or said SCADA network;
    j) wherein said network communicates with said first or second subsystem while said first or second subsystem is in communication with said camera; and
    k) monitoring adjustments to the control made by a human; and
    l) receiving one or more frames of video that are communicated with the second subsystem, and retrieving with said second subsystem said one or more frames of video on demand;
    m) wherein the image or image portion comprises a field of view, and
    n) operating a change detection means provided in at least one of the first subsystem or second subsystem, and detecting, with the change detection means, the entry of an object or hand into the field of view, and, when the entry of the object or hand into the field of view is detected, sending a frame or video, capturing a frame or video when the change detection means detects a human adjusting a control or taking actions; and
    o) processing the detected changes of the human actions adjusting a control or taking actions and providing additional information in conjunction with the sequence of digital values associated with the said devices that are in use for monitoring a condition, such as the gauge, meter, light or other human-readable machine monitor, that were obtained from the image or extracted image portion.

2. The method of claim 1, wherein extracting and digitizing an image comprises selecting a portion of the image or image portion that comprises a portion of a panel, and representing a location on the panel where a readable element is located by the selection of the image portion.

3. The method of claim 2, wherein the readable element comprises a gauge, meter, switch, dial, light, or other indicator.

4. The method of claim 1, wherein said camera and said communications component for communicating images are configured together and include one or more processing components with circuitry for processing the images from the camera.

5. The method of claim 4, including regulating the rate of the picture frames with a frame timer.

6. The method of claim 4, including regulating the capture of images to capture frames of the panel when a change in the panel being imaged occurs.

7. The method of claim 1, wherein the method of monitoring monitors a device that comprises a panel.

8. The method of claim 7, wherein monitoring the panel includes monitoring a component of the panel, and wherein identifying with the change frame detection mechanism when a change in the image or image portion containing the device being monitored within the field of view has occurred comprises identifying when a change to the monitored component of the panel has occurred.

9. The method of claim 8, wherein the monitored component comprises a meter.

10. The method of claim 1, wherein a plurality of cameras are provided, and wherein the device being monitored includes a plurality of components to be respectively monitored by the respective plurality of cameras.

11. The method of claim 1, wherein the plurality of cameras are provided in a single housing.

12. The method of claim 1, wherein said first subsystem includes a frame timer for regulating the frequency of the image capture rate, and wherein operating the camera captures images the capture rate of which is regulated by the frame timer.

13. The method of claim 1, wherein said first subsystem is configured to capture continuous video from the camera.

14. The method of claim 1, wherein said first subsystem is configured to process the image frame or video by compressing, formatting, encrypting, or one or more of these processes.

15. The method of claim 1, including receiving image inputs from the camera through the first subsystem supervisory computer or control circuitry that is coupled to the camera, and manipulating the camera images with the first subsystem by:
   a) regulating the frequency of the image capture rate with a frame timer;
   b) wherein the camera images are comprised of frames of images or video, and processing the image frame or video of the camera images by one or more of compressing, formatting, or encrypting the image frame or video; and
   c) transmitting the processed image frame or video to the second subsystem.

16. The method of claim 15, wherein the first subsystem comprises a remote subsystem, and wherein the second subsystem receives processed image frames or video from the first subsystem, and wherein the method includes manipulating the processed image frames or video with the second subsystem is configured to manipulate the processed image frames or video by:
   a) processing the image frame or video by one or more of decompressing, formatting, or decrypting the image frames or video received from the first subsystem;
   b) storing the image frames or video in a memory or storage component;
   c) extracting at least one portion of the image; and
   d) digitizing the extracted image portion to generate a sequence of digital values.

17. The method of claim 16, wherein said device monitored comprises a panel having a plurality of readable elements thereon, wherein said readable elements include at least one first readable element and at least one second readable element; wherein extracting at least one portion of the image includes extracting from the image at least a first portion of the image that contains the image of the first readable element and extracting from the image at least a second portion of the image that contains the image of the second readable element; wherein digitizing the extracted image portion to generate a sequence of digital values is done for each extracted image to generate a sequence of digital values for the first readable element, and a second sequence of digital values for the second readable element.

18. The method of claim 16, wherein the first subsystem supervisory computer or control circuitry comprises a first supervisory computer or control circuitry, and wherein the second subsystem supervisory computer or control circuitry comprises a second supervisory computer or control circuitry.

19. The method of claim 1, wherein the first subsystem comprises a remote subsystem which is remote in regard to said second subsystem.

* * * * *